United States Patent [19]

Nakamura et al.

[11] Patent Number: 5,679,094
[45] Date of Patent: Oct. 21, 1997

[54] ENGINE CYLINDER VALVE CONTROL SYSTEM

[75] Inventors: Makoto Nakamura, Zushi; Shinichi Takemura, Fujisawa; Teturo Goto, Hadano, all of Japan

[73] Assignee: Nissan Motor Co., Ltd., Yokohama, Japan

[21] Appl. No.: 576,359

[22] Filed: Dec. 21, 1995

[30] Foreign Application Priority Data

Dec. 28, 1994 [JP] Japan ................................ 6-326573
Aug. 21, 1995 [JP] Japan ................................ 7-211446

[51] Int. Cl.⁶ .................................................. B60K 41/10
[52] U.S. Cl. ........................................ 477/111; 477/110
[58] Field of Search .................................. 477/107, 110, 477/111

[56] References Cited

U.S. PATENT DOCUMENTS

| | | | |
|---|---|---|---|
| 4,104,991 | 8/1978 | Abdoo | 477/111 |
| 5,056,378 | 10/1991 | Aimone et al. | 477/109 |
| 5,184,577 | 2/1993 | Kato et al. | 123/90.15 |
| 5,333,579 | 8/1994 | Hara et al. | 123/90.17 |
| 5,496,229 | 3/1996 | Miyamoto | 477/111 |

FOREIGN PATENT DOCUMENTS

| | | |
|---|---|---|
| 367 532 | 10/1989 | European Pat. Off. . |
| 367 552 | 10/1989 | European Pat. Off. . |
| 62-45960 | 2/1987 | Japan . |
| 63-167016 | 7/1988 | Japan . |
| 64-3215 | 1/1989 | Japan . |
| 1311562 | 6/1970 | United Kingdom . |

OTHER PUBLICATIONS

"Nissan Full Range Electronically Controlled Automatic Transmission of the RE4R01A Type," published by Nissan Motor Co., Mar. 1987.

*Primary Examiner*—Charles A. Marmor
*Assistant Examiner*—Sherry Lynn Estremsky
*Attorney, Agent, or Firm*—Lowe, Price, LeBlanc & Becker

[57] ABSTRACT

A cylinder valve control stem for a vehicle drivetrain including a transmission and an engine having a variable valve control mechanism which can vary valve lift diagram in response to a control signal. A controller develops the control signal in response to varying operating condition of the engine. The controller derives, upon initiation of a shift in the transmission, engine speed to be established after completion of the shift and corrects the control signal such that the variable valve control mechanism provides one of various valve lift diagrams whose predetermined value in engine speed is not exceeded by the derived engine speed.

11 Claims, 10 Drawing Sheets

5,679,094

1

ENGINE CYLINDER VALVE CONTROL SYSTEM

BACKGROUND OF THE INVENTION

The present invention relates to an engine cylinder valve control system for a vehicle drivetrain with an engine and a transmission.

According to JP-A 63-167016, it is known to selectively use two different cams, namely a low speed cam and a high speed cam, to lift each of cylinder valves, such as intake valves or exhaust valves, to provide different valve lifts and durations for producing optimum engine performance.

According to GB-A 1311562, a device is known to move a single cam relative to its driving shaft. According to this known device, it is possible to continuously vary valve duration with valve lift unchanged.

JP-A 62-45960 teaches that the maximum engine speed be lowered when each of the engine cylinder valves is lifted along a cam profile with a narrowed valve duration and a high valve lift so as to prevent undesired irregular motion of the cylinder valves. The use of such a cam profile is advantageous for producing high output performance at low engine speeds.

JP-A 64-3215 teaches that different cam profiles be used for economy mode of transmission gear shift schedule and power mode of transmission gear shift schedule.

An object of the present invention is to provide a cylinder valve control system for a vehicle drivetrain which, with less or no change in valve lift, valve duration can be narrowed sufficiently for increased torque engine performance at low speeds without inducing undesired irregular motion of the cylinder valve.

SUMMARY OF THE INVENTION

The present invention provides a cylinder valve control system, for a vehicle drivetrain including an engine and a transmission, comprising a mechanism to vary valve lift diagram along which the cylinder valve is lifted against a valve spring thereof in response to a control signal, and a controller for developing the control signal in response to varying operating condition of the engine, wherein:

the controller derives, at initiation of a shift in the transmission, a value in engine speed to be established after completion of the shift;

the controller has stored therein various predetermined values in engine speed assigned to various valve lift diagrams; and the controller effects correction of the control signal before the completion of the shift such that the mechanism adjusts the valve lift diagram to one of the various valve lift diagrams whose predetermined value in engine speed fails to be exceeded by the derived value in engine speed.

2

Figure 3:
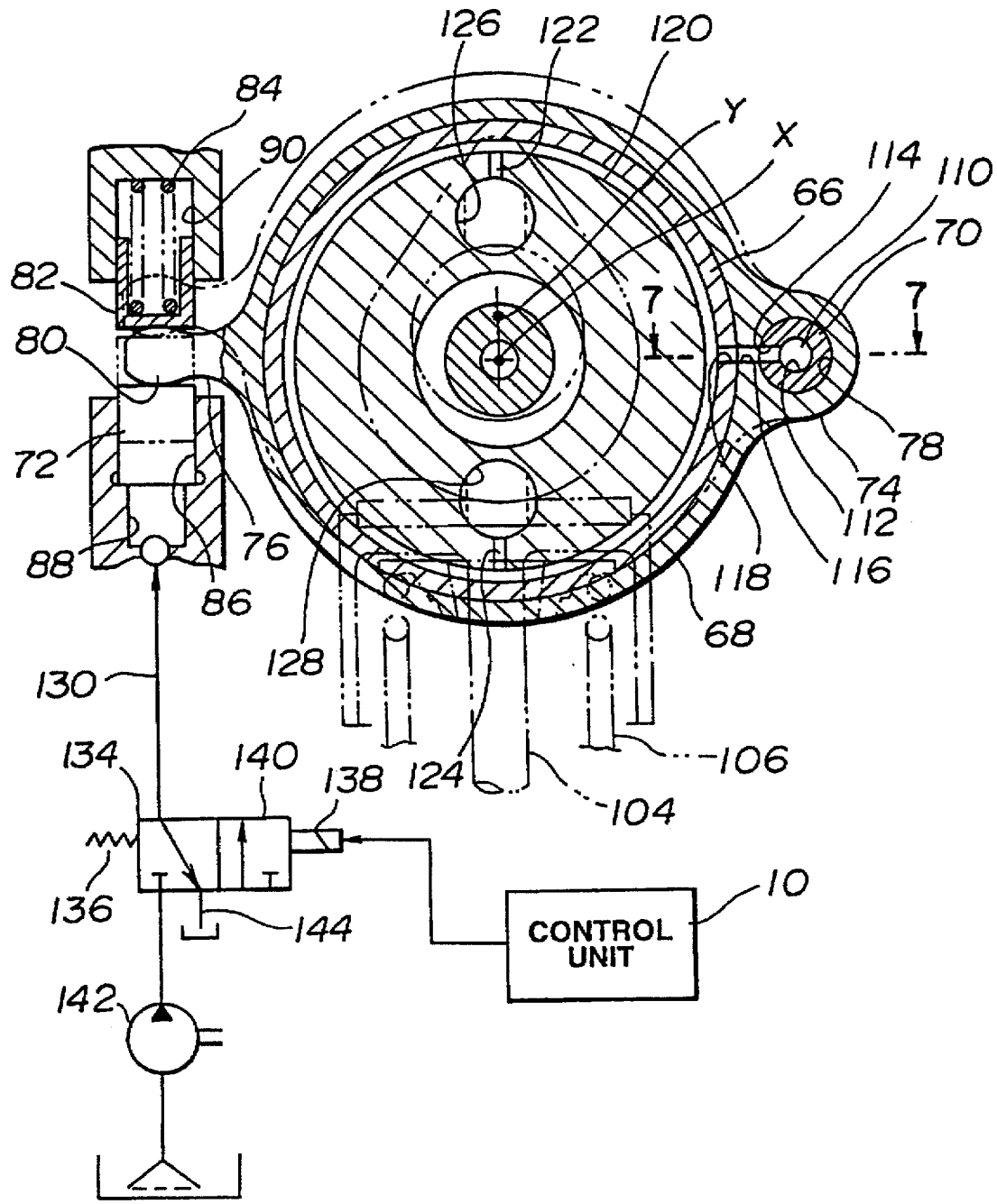
FIG. 3 is a block diagram of a control system shown in association with a slightly enlarged section taken through the line 3—3 of FIG. 2.
Figure 4:
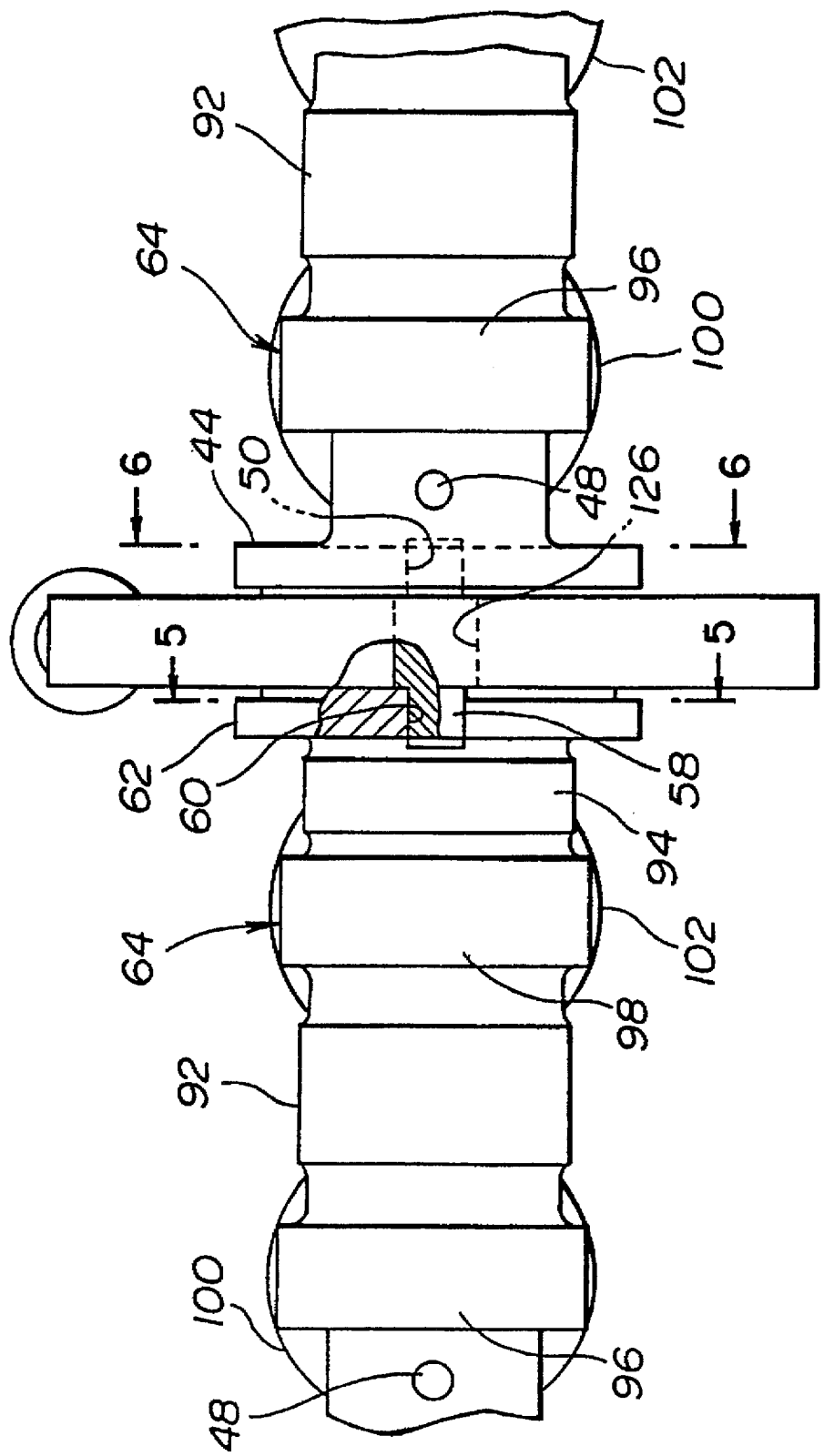
FIG. 4 is a plan view viewing FIG. 1 from the top.
Figure 5:
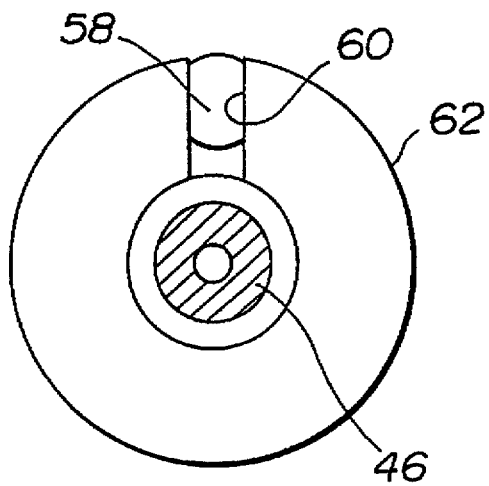
Figure 6:
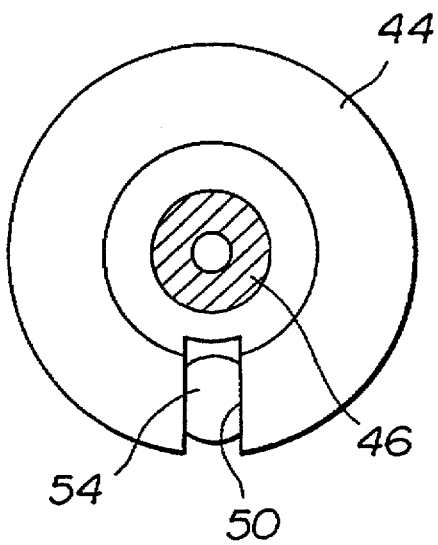
Figure 7:
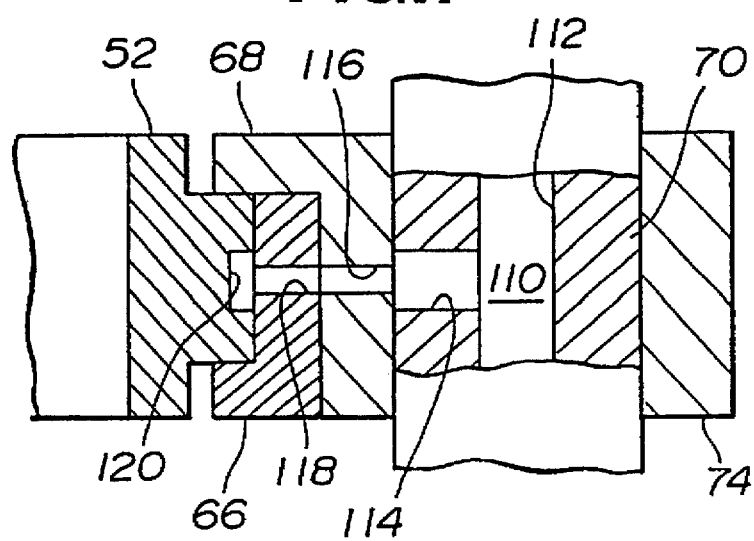
Figures 8A, 8B:
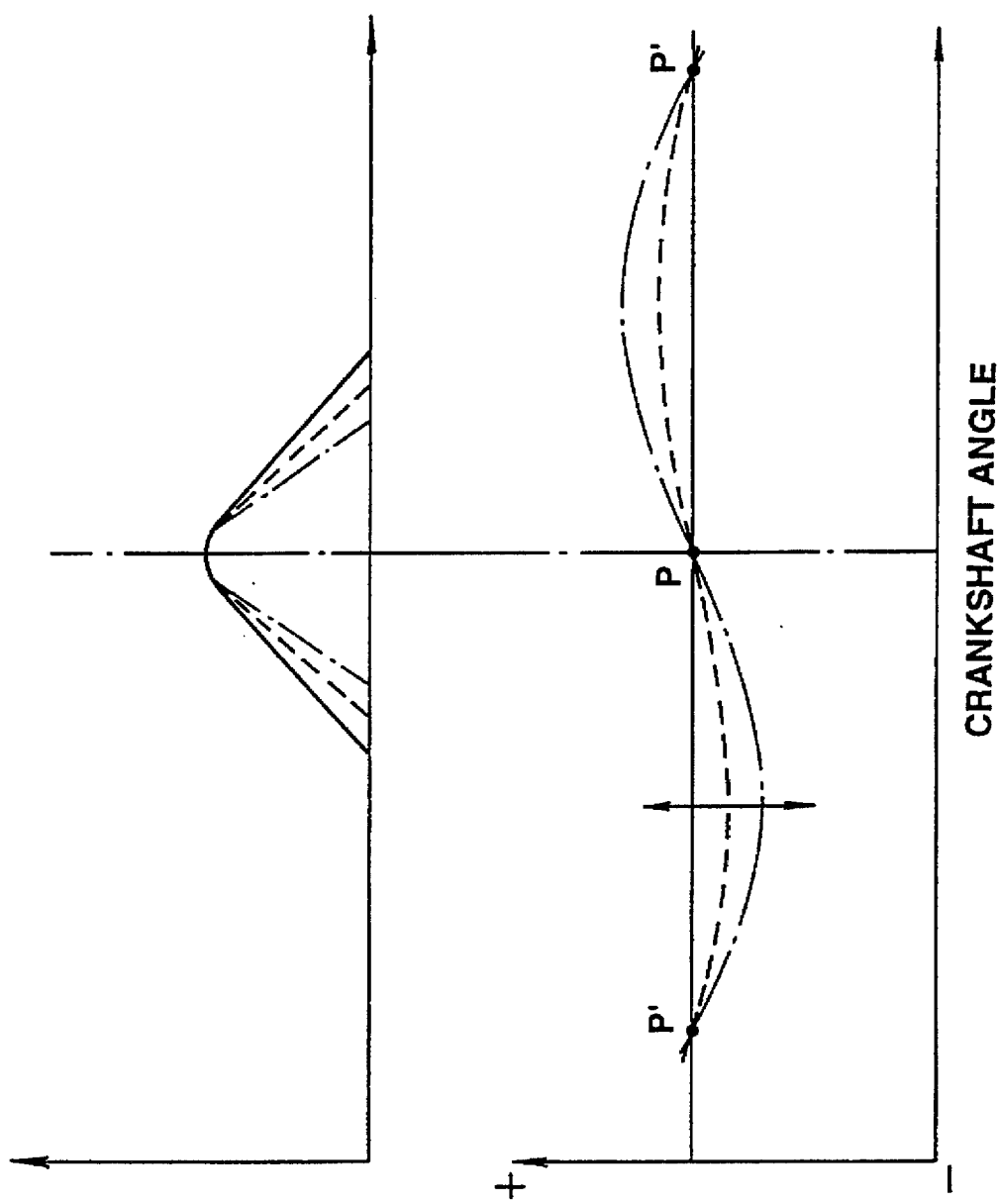
Figure 9:
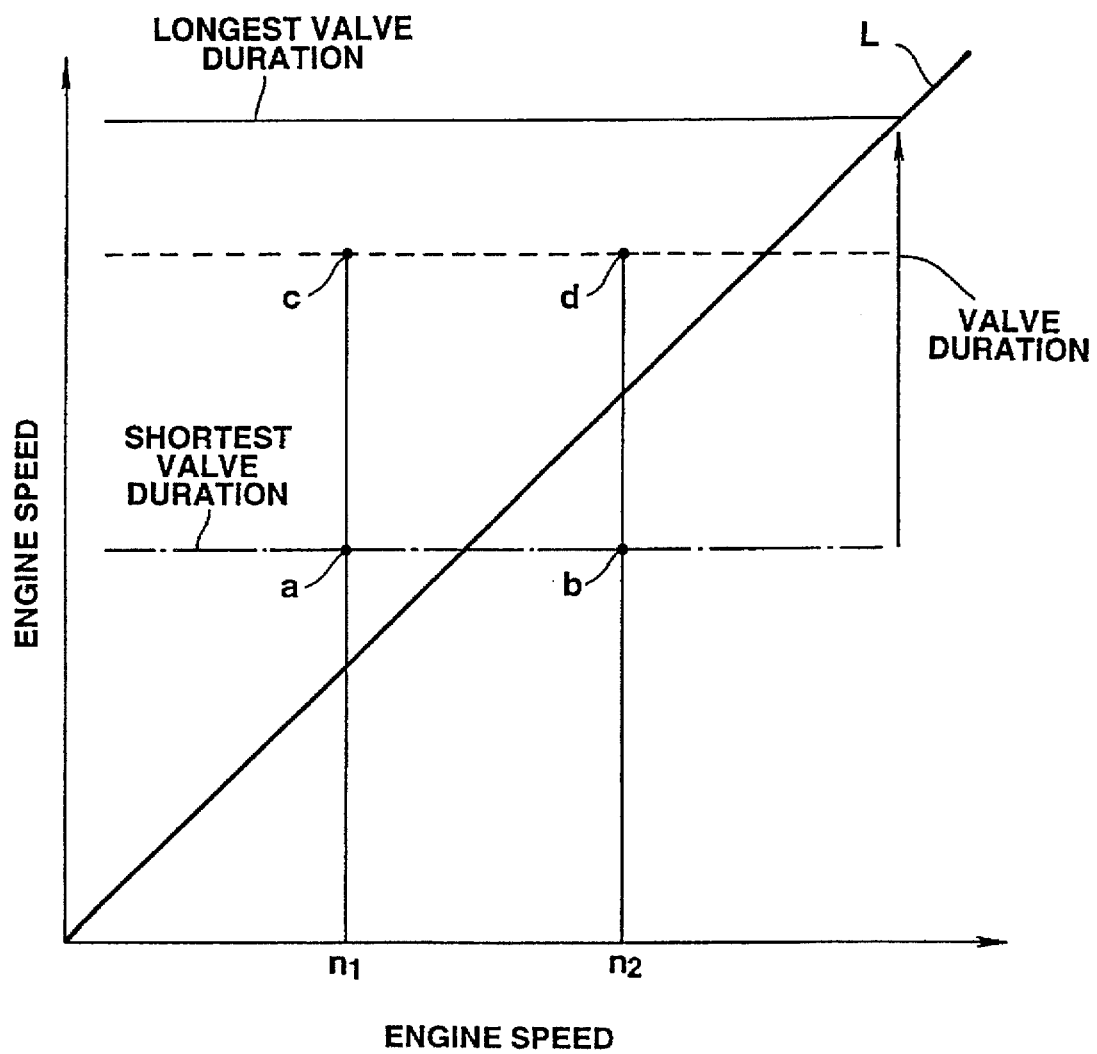
Figure 10:
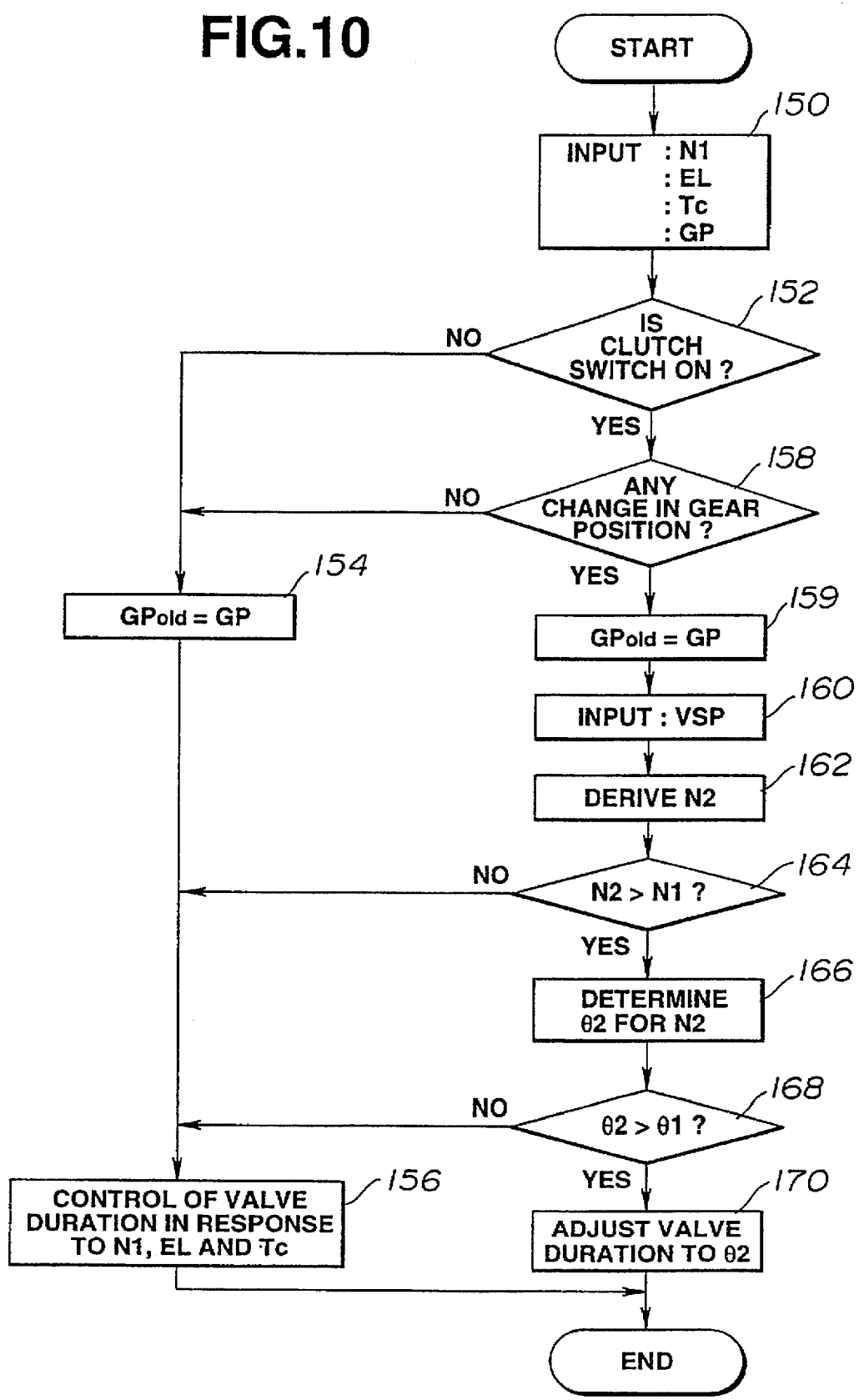
Figure 11:
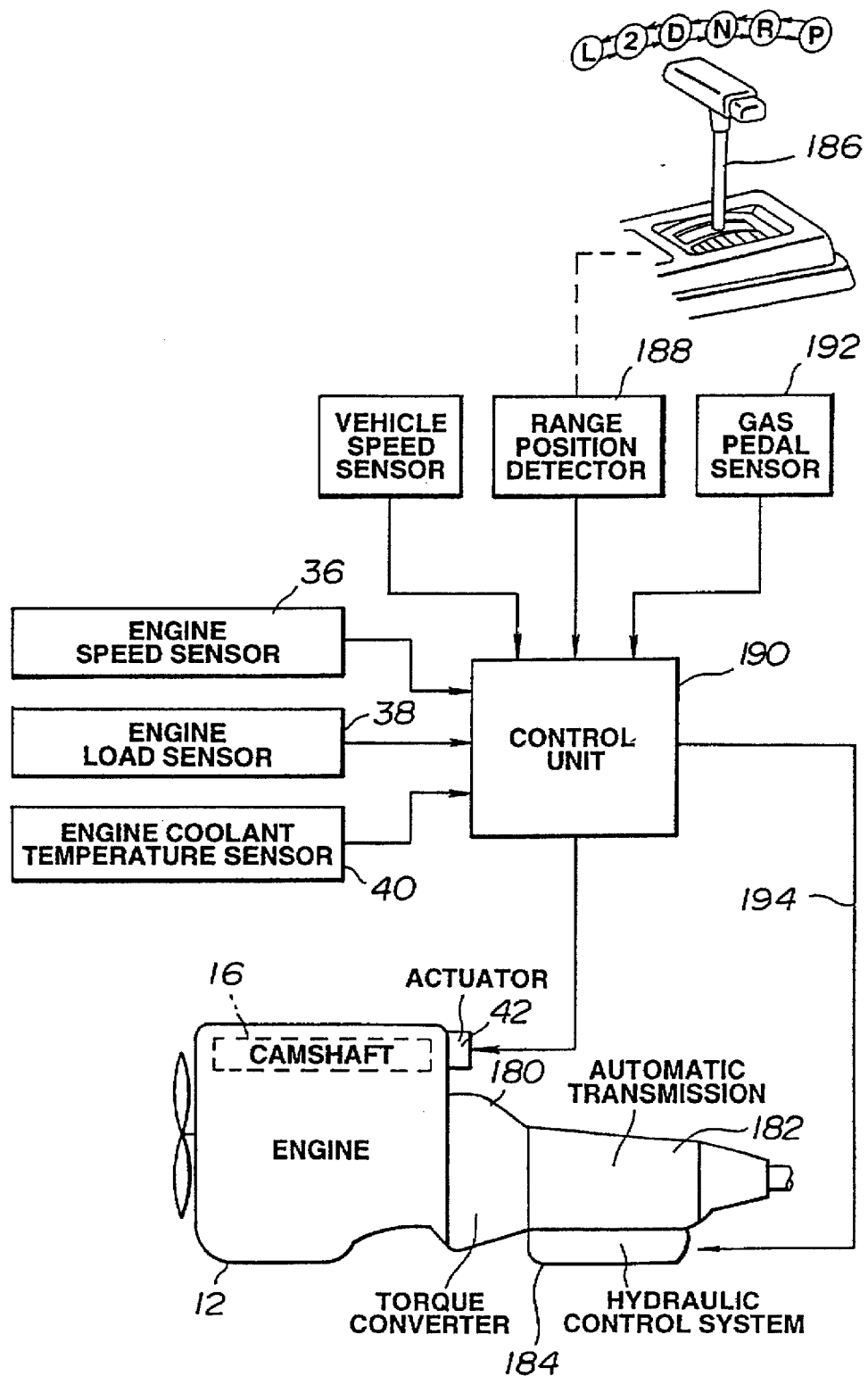
Figure 12:
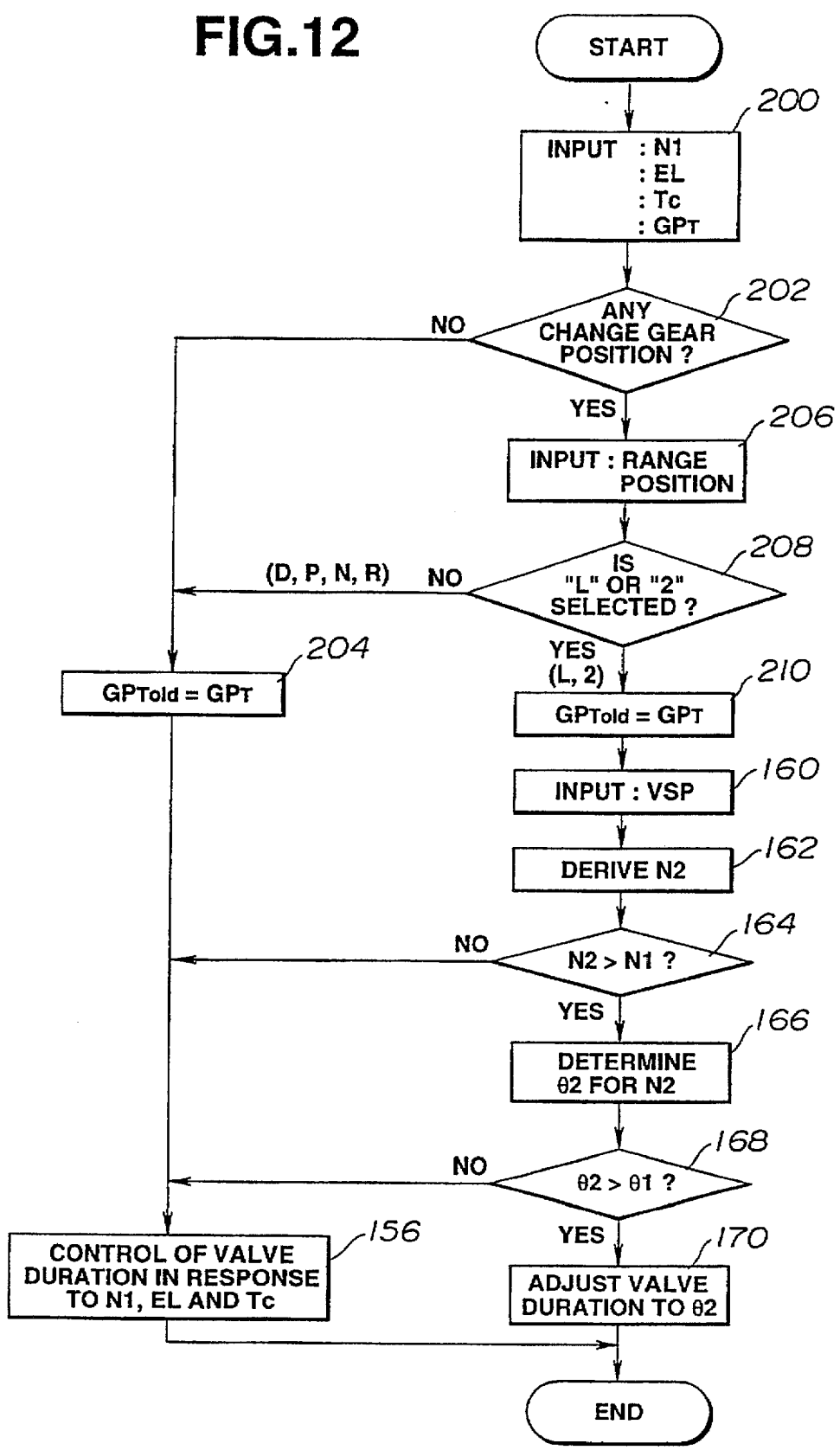

FIG. 5 is a section taken through the line 5—5 of FIG. 4;

FIG. 6 is a section taken through the line 6—6 of FIG. 4;

FIG. 7 is an enlarged section taken through the line 7—7 of FIG. 3;

FIG. 8A shows various valve lift diagrams which can be provided by the variable cylinder valve control mechanism;

FIG. 8B shows phase difference vs. crankshaft angle plots of the valve lift diagrams, respectively;

FIG. 9 shows the relationship between lower limits of engine speeds inherent with various valve durations which induce undesired irregular motion of cylinder valve and actual values in engine speed;

FIG. 10 is a flow chart of a control routine implementing the present invention;

FIG. 11 is a block diagram of the relationship between the controller, the engine and the transmission of the automatic type; and FIG. 12 is a flow chart of another control routine implementing the present invention.

DETAILED DESCRIPTION OF THE INVENTION

Figure 1:
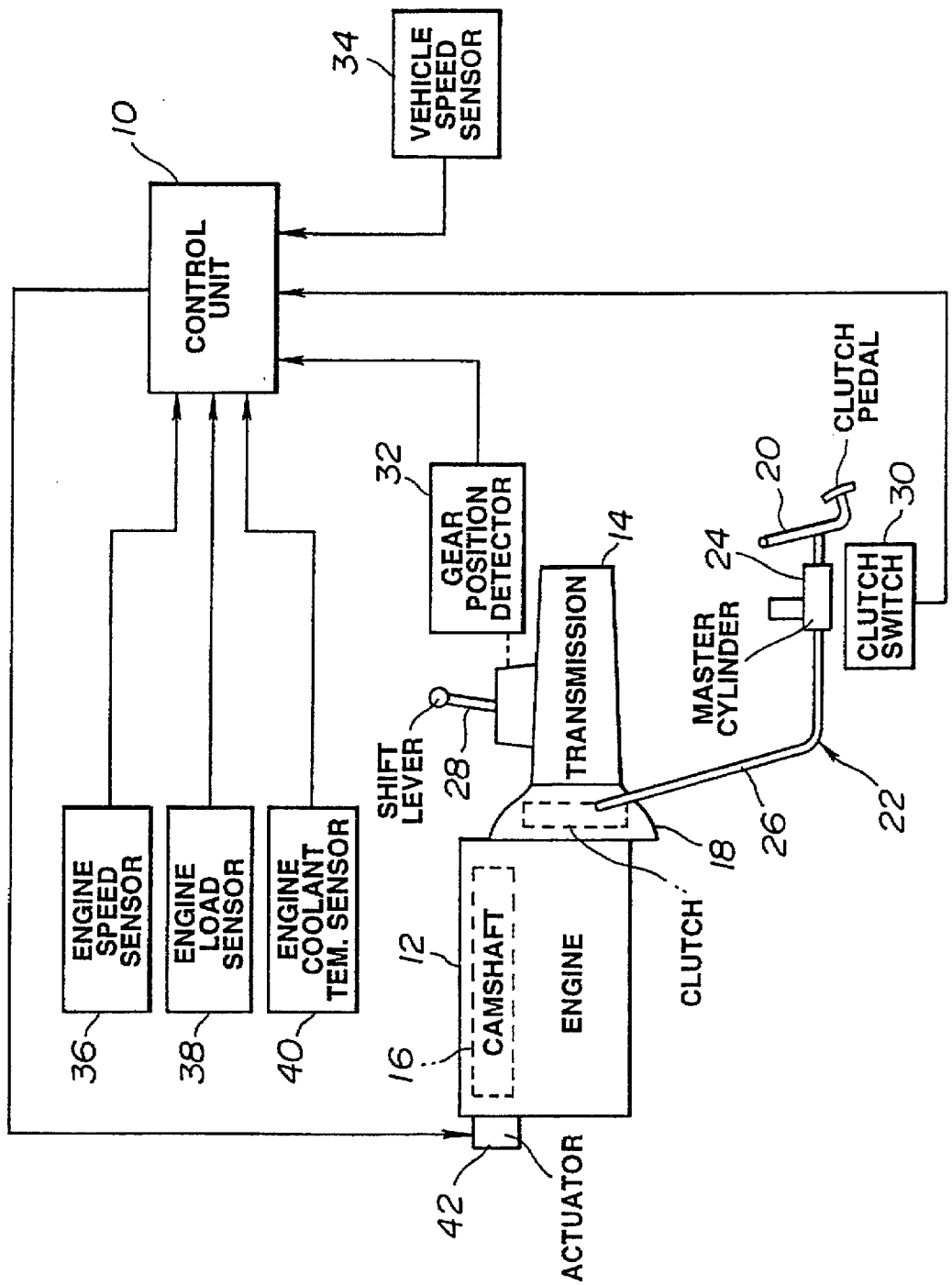
FIG. 1 is a block diagram showing the relationship between the controller, the engine and the transmission of the manual type.

Referring to FIG. 1, the controller or control unit is designated generally by the reference numeral 10, the engine is designated generally by the reference numeral 12 and the transmission is generally designated by the reference numeral 14. The control unit 10 includes an input/output control unit (I/O unit), a central processor unit (CPU), a random access memory (RAM), a read only memory (ROM), and a solenoid driver. The engine 12 is of the so-called overhead camshaft type and includes intake and exhaust camshafts, designated generally by the reference numeral 16, for intake and exhaust cylinder valves provided for a bank of cylinders. Each of such cylinder valves is of the poppet type and biased by a valve spring toward a closed position thereof.

At least one of the camshafts 16, for example, the intake camshaft in this embodiment, is axially split and includes a plurality of cams which are hollowed to receive a driving shaft. Each of the hollow cams has axially spaced two identical cam lobes to control the two intake valves of the adjacent one of the cylinders and is drivingly associated with the driving shaft via a device for moving the hollow cam relative to the driving shaft. The device of this kind is well known and described for example in U.S. Pat. No. 5,333,579 issued on Aug. 2, 1994. The valve control mechanism is further described later in connection with FIGS. 2 to 7.

Throttle valve, which opens in degrees in response to depression of a gas pedal by the vehicle operator, controls the torque output of the engine 12, which outputs its power through the engine output shaft. The engine output shaft is connected to a clutch 18 to engage and disengage the engine 12 to and from the input shaft of the transmission 14. The disengagement of the clutch 18 is controlled by depression of a clutch pedal 20 of a hydraulic clutch operating mechanism 22 by the vehicle operator. The hydraulic clutch operating mechanism 22 includes a master cylinder 24 operated by the clutch pedal 20 and a hydraulic pipe 26.

The transmission 14 is of the manual type and provides five forward speeds or gear positions and one reverse speed or gear position which are selected by manipulation of a shift lever 28 by the vehicle operator. For effecting a shift in the transmission, the vehicle operator depresses the clutch pedal 20 to disengage the engine 12 from the input shaft of the transmission, and manipulates the shift lever 28 to establish a new gear position, and then releases the clutch pedal 20 to engage the engine 12 to the input shaft of the transmission 14.

A clutch switch 30 is provided which is turned on in response to depression of the clutch pedal 20 to disengage the clutch 18. The clutch switch 30 otherwise is turned off. A gear position detector 32 is provided which provides an output indicative of which one of the gear positions the gear shift lever 28 is placed at. The outputs of the clutch switch 30 and the gear position detector 32 are fed to the controller 10 where the initiation of shift operation in the transmission 14 is determined upon occurrence of a change in position of the shift lever 28 after the clutch switch 30 has been turned on and a new speed or gear position desired is determined from a new position of the shift lever 28.

A vehicle speed sensor 34 is provided which measures revolution speed of the output shaft of the transmission 14 and provides, as an output, a vehicle speed indicative signal indicative of the measured revolution speed of the transmission output shaft. The output of the vehicle speed sensor 34 is fed to the controller 10 where information of vehicle speed and a gear ratio inherent with the new gear position are used to derive an engine speed at which the engine 12 is to operate upon completion of the shift operation.

The controller 10 is supplied with outputs of an engine speed sensor 36, an engine load sensor 38 and an engine coolant temperature sensor 40. The engine speed sensor 36 measures revolution speed at which the engine 12 operates and generates an engine speed indicative signal indicative of the measured revolution speed. The engine load sensor 38 measures the amount of load with which the engine 12 operates and generates an engine load indicative signal indicative of the measured engine load. The engine load sensor 38 may be an air flow meter which measures the amount of intake air to the engine 12 or a throttle position sensor which measures the opening degree at which the engine throttle valve opens. The engine coolant temperature sensor 40 measures the temperature of engine coolant and generates an engine coolant temperature indicative signal indicative of the measured temperature of the engine coolant. The controller 10 takes information of engine speed, engine load and engine coolant temperature from the outputs of the sensors 36, 38 and 40 to determine the appropriate valve lift diagram for the current engine operating condition unless a shift occurs in the transmission 14. The output of the microcomputer, indicative of the determined valve lift diagam, is supplied to the solenoid driver which can vary duty ratio of a solenoid of an actuator 42 of the cam moving device in response to the output of the microcomputer.

Figure 2:
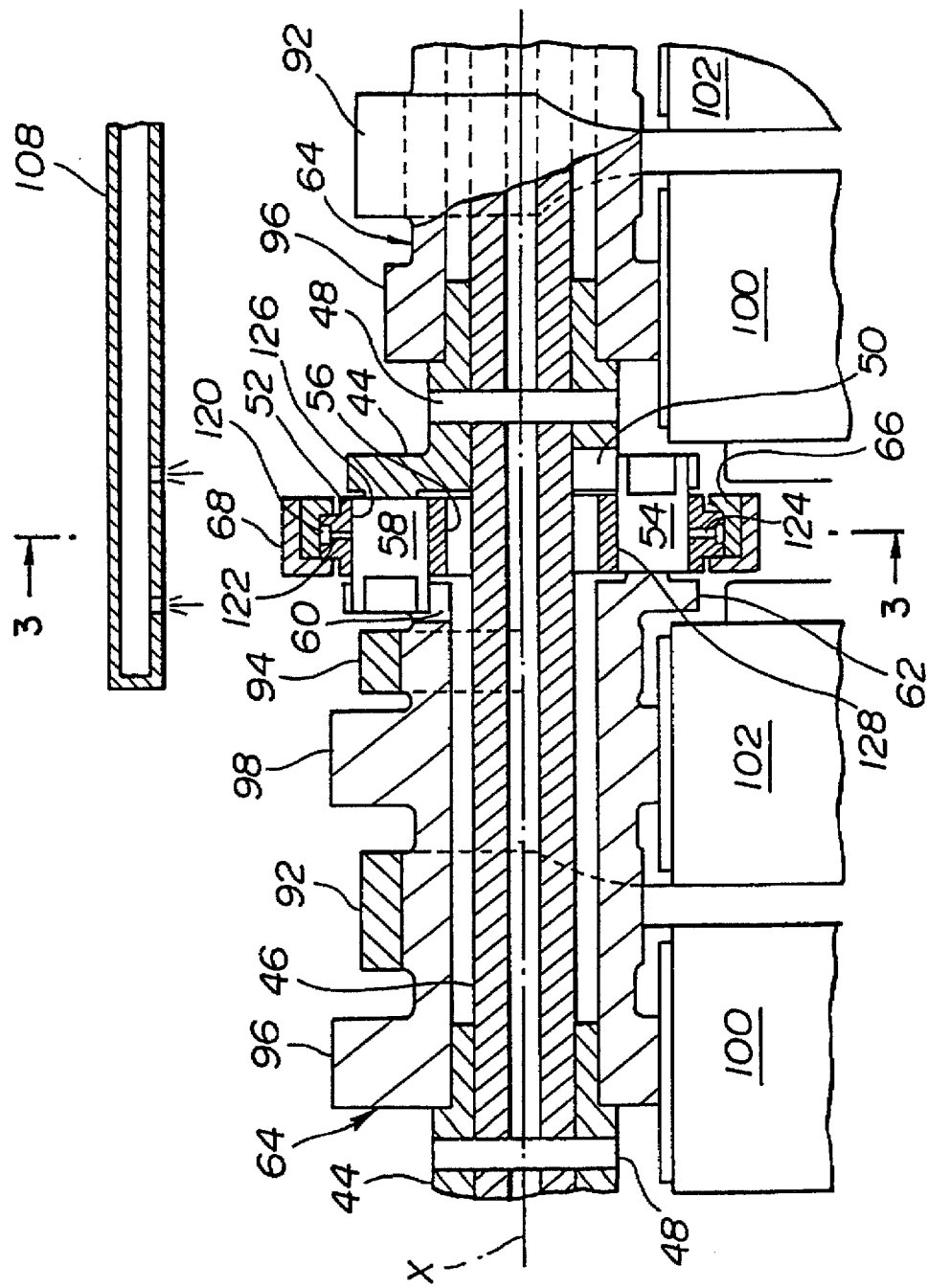
FIG. 2 is a fragmentary view of the engine, partly broken away to illustrate a variable cylinder valve control mechanism.

Referring to FIG. 2, a drive member in the form of a drive collar 44, is rotatable with a driving shaft 46 by a cotter pin 48. The drive collar 44 is formed with a radial slot 50 (see FIG. 6). An intermediate member in the form of an annular disc 52 has a first pin 54 projecting from one face thereof into the radial slot 50 of the drive collar 44. The annular disc 52, with a wide central hole 56, is fitted around the driving shaft 46 with ample radial clearance, and has another or second pin 58 projecting from its opposite face into a radial slot 60 cut in a driven collar 62 (see FIG. 5), forming an integral part of the adjacent one of hollow cams 64 whose movement is being controlled. The annular disc 52 is supported in a bearing 66 of a support or a disc housing 68 which itself can be moved to vary the eccentricity of the annular disc 52 with respect to the driving shaft 46 (see FIG. 3). By reason of the differing positions in which the annular disc 52 can be placed within the plane of rotation, and thus by reason of the different positions of the radial slot 50 of the drive collar 44 engaged by the first pin 54 of the disc 52 and the radial slot 60 of the driven collar 62 engaged by the second pin 58 of the disc 52, the angular velocities imparted to the cam 64 at different rotational positions can be varied.

As shown in FIG. 3, the disc housing 68 is disposed between and supported by a rocker shaft 70 and a hydraulic piston 72. The rocker shaft 70 is rotatably supported by a cylinder head, not shown, of the engine, and arranged in parallel relation with the driving shaft 46. At a portion angularly displaced, with respect to the driving shaft 46, from the rocker shaft 70 through an angle of 180 degrees, the hydraulic piston 72 is held by the engine cylinder head. The disc housing 68 has on a circular outer periphery thereof two projections, namely a first projection 74 and a second projection 76. The first projection 74 has a hole 78 receiving the rocker shaft 70 (see FIG. 7). The second projection 76 has a rounded top 80 interposed between the hydraulic piston 72 and a spring retainer 82 for a return spring 84. The hydaulic piston 72 is slidably received in a bore 86 cut in the engine cylinder head. At a closed end thereof, the bore 86 is connected to a common passage 88, while the bore 86 has an open end thereof opposed to and spaced from a bore 90 receiving therein the return spring 80 and the spring retainer 82. The return spring 80 acts between a closed end of the bore 90 and the spring retainer 82 to set the hydraulic piston 72 in a so-called spring set position as illustrated in the fully drawn line in FIG. 3. In the illustrated spring set position, the disc housing 68 holds the annular disc 52 in concentric relationship with the driving shaft 46.

Referring to FIG. 2, the hollow cams 64 are supported through the associated two cam brackets 94 and 96 by the engine cylinder head, and they are driven by the driving shaft 46. Each of the cams 64 has two cam lobes 96 and 98 which control tappets 100 and 102 of two cylinder valves against their valve springs, only one valve being shown in phantom at 104 in association with its valve spring 106 in FIG. 3, for one of the cylinders. The driving shaft 46 is supported through the drive collars 62 by the hollow cams 64 and rotatable by a toothed wheel, not shown, which is drivingly connected by a chain, not shown, to the engine crankshaft.

The pins 54 and 58 are rotatably supported by the annular disc 52 and angularly displaced from each other at an angle of 180 degrees. The pins 54 and 58 have cylindrical bodies, but have portions projecting from the opposite faces of the annular disc 52 flattened for slidable fit in the associated slots 50 and 60 of the drive and driven collars 44 and 62.

Returning to FIG. 2, designated by the reference numeral 108 is a lubrication oil supply pipe above the engine cylinder head. This pipe 108 is provided with a plurality of openings which are arranged to direct jets of lubrication oil to the interface between the pins 54 and 58 and the associated slots 50 and 60 of the drive and driven collars 44 and 62. The lubrication oil supply pipe 108 is connected to a lubrication oil gallery, not shown, of the engine. As best seen in FIG. 7, the rocker shaft 70 is formed with an axial bore 112 and a radial passage 114 connected to the axial bore 112. At a radially outer end thereof, the radial passage 114 is in registry with a radial passage 116 of the disc housing 68 which in turn is in registry with a radial opening 118 cut through the bearing 66. The annular disc 52 is formed with a circumferential groove 120 which the radial opening 118 of the bearing 66 communicates with. At a bottom wall thereof, the circumferential groove 120 is formed with two holes 122 and 124 (see FIGS. 2 and 3) communicating with cylindrical axial through bores 126 and 128, respectively, which rotatably receive the pins 58 and 54, respectively. The lubrication oil is supplied to the axial bore 112 of the rocker shaft 70 from the lubrication oil gallery. The lubrication oil passes through the radial passage 114, the radial passage 116 and the radial opening 118 to the circumferential groove 120. From the circumferential groove 120, the oil passes through the holes 122 and 124 to the cylindrical axial through bores 126 and 128. In this manner, smooth rotation of the annular disc 52 within the disc housing 68 and smooth movement of the pins 54 and 58 relative to the annular disc 52 are assured.

In FIG. 3, the phantom line illustrates the maximum position which the rounded top 80 of the second projection 76 of the disc housing 68 can be lifted to. During movement of the rounded top 80 from the fully drawn illustrated position to the phantom line illustrated position, the disc housing 68 moves angularly about an axis of rotation of the rocker shaft 70. In the phantom line illustrated position, the annular disc 52 is eccentric with respect to the driving shaft 46. The magnitude of the eccentricity of an axis Y of rotation of the annular disc 52 with respect to an axis X of rotation of the driving shaft 46 can be varied in a continuous manner by moving the rounded top 80 of the second projection 76 of the disc housing 68 from the fully drawn spring set position to the phantom line illustrated position and vice versa. Since the direction of the cam peak of each of the cam lobes 96 and 98 is aligned with the direction of eccentricity displacement of the annular disc 52 at the instant when the pins 54 and 58 are aligned with the displacement, the valve duration or opening period is narrowed to the shortest or minimum with the maximum valve lift unchanged as illustrated by one-dot chain line drawn valve lift diagram shown in FIG. 8A. In FIG. 8A, the fully drawn line illustrates a valve lift diagram when the disc housing 68 is in the spring set position where the annular disc 52 is concentric with the driving shaft 46 and the magnitude of eccentricity is minimum and zero. In this position, the valve duration is maximum. The broken line illustrates a valve lift diagram when the magnitude of eccentricity is intermediate between zero and the maximum which is provided when the disc housing 68 is in the phantom line drawn position as illustrated in FIG. 3. From the valve lift diagrams, it is seen that the valve duration can be varied continuously by varying the magnitude of eccentricity. With the maximum valve lift unchanged, the valve duration narrows as the magnitude of eccentricity increases, while the valve duration broadens as the magnitude of eccentricity decreases.

It is evident that if the driving shaft 46 and each of the drive collars 44 rotate at the same speed, the associated annular disc 52 will accelerate or decelerate depending on the relative angular and instantaneous angular positions of the various interconnected components. In two relative angular positions, the annular disc 52 will rotate at a speed equal to that of the driving shaft 46, while its rotation speed will be higher or lower than that of the driving shaft 46 in intermediate angular positions. These variations in relative speed are imparted by the transmission of motion by the annular disc 52 through the pin 58 and the radial slot 60 to the hollow cam 64, with the result that the hollow cam 64 has maximum and minimum instantaneous velocities.

In FIG. 8B, the one-dot chain line illustrates variations in phase difference between the driving shaft 46 and the hollow cam 64 when the magnitude of eccentricity is the maximum to provide the valve lift diagram as illustrated by the one-dot chain line in FIG. 8A. The broken line in FIG. 8B illustrates variations in phase difference between the driving shaft 46 and the hollow cam 64 when the magnitude of eccentricity is intermediate to provide the valve lift diagram as illustrated in the broken line in FIG. 8A. In FIG. 8B, the phase difference becomes zero at points P', P and P', and the sign of phase difference is positive when the hollow cam 64 advances, but nagative when the hollow cam 64 retards.

Comparing the valve lift diagram as illustrated by the one-dot chain line in FIG. 8A with the variations in phase difference as illustrated by the one-dot chain line in FIG. 8B reveals that the valve opening timing is retarded since the hollow cam 64 is retarded before the point P but after the previous point P' and the valve closing timing is advanced since the hollow cam 64 is advanced after the point P and before the next point P'. Each of the cam lobes 96 and 98 peaks at the point P so that the crankshaft angle at which the valve lift become maximum is unchanged with variations in valve duration. In other words, each of the cam lobes 96 and 98 peaks at a middle point in the acceleration phase between points where the annular disc 52 rotates at a speed equal to that of the driving shaft 46. In this case, the valve lifts and falls at the same speed. The adjustment of the peak of each of the cam lobes 96 and 98 is not limited to this example, and may be modified.

Referring to FIG. 3, the magnitude of eccentricity can be varied continuously by varying the hydraulic pressure developed in the common passage 88. The common passage 88 is connected to one end of a schematically illustrated hydraulic line 130 whose opposite end is connected to a solenoid operated valve 132 of the duty controlled type. This solenoid operated valve 132 has a duty-off position 134 set by a return spring 136 when a solenoid 138 is not energized and takes a duty-on position 140 when the solenoid 138 is energized. In the duty-off position 134, the hydraulic line 130 is isolated from a pump 142 and connected to a drainage 144, thus allowing the discharge of hydraulic fluid from the common passage 88. In the duty-on position 140, the hydraulic line 130 is isolated from the drainage 144 and connected to the pump 142, allowing the supply of hydraulic fluid to the common passage 88. The ratio of time period when the duty-on position 140 is maintained to an unit time can be adjusted in response to a duty determined by the controller 10. The hydraulic pressure in the common passage 88 is controlled by varying the duty at the controller 10. In other words, this hydraulic pressure increases as the duty is increased and decreases as the duty is decreased.

Returning to FIG. 8A, it is noted that the magnitude of acceleration which each of the cylinder valves 104 is subjected to during each of lift and fall times increases as the valve duration is narrowed. This means that lower limit of engine speeds which induce irregular motion of each of the cylinder valves 104 drops as the valve duration is narrowed.

Referring to FIG. 9, both the vertical and horizotal axes represent engine speed, and an angled straight line L is drawn to interconnect points, each representing the same engine speed not only on the vertical axis but also on the horizontal axis. A group of parallel horizontal straight lines represent three typical valve durations provided by the three typical valve lift diagrams illustrated in FIG. 8A, respectively. The horizontal straight line illustrated by the one-dot chain line represents a lower limit of engine speeds inherent with the shortest valve duration provided by the valve lift diagram illustrated by the one-dot chain line in FIG. 8A. The horizontal straight line illustrated by the dotted line represents a lower limit of engine speeds inherent with an intermediate valve duration provided by the valve lift diagram illustrated by the dotted line in FIG. 8A. The horizontal straight line illustrated by the fully drawn line represents a lower limit of engine speeds inherent with the longest valve duration provided by the valve lift diagram illustrated by the fully drawn line in FIG. 8A. As mentioned before, the lower limit of engine speeds which induce undesired irregular motion of cylinder valves differs with different valve durations and drops as the valve duration is narrowed. Each of the parallel horizontal straight lines is drawn to interconnect a point on the vertical axis which represents its inherent lower limit of engine speeds and a point on the angled straight line L which represents this lower limit of engine speeds.

Referring to FIG. 9, let us now assume that, when the cylinder valves are operated in accordance with the valve lift diagram as illustrated by the one-dot chain line in FIG. 8A, a shift in the transmission 14 causes an increase in engine speed from $n_1$ to $n_2$. In FIG. 9, this change in engine speed is expressed by a change from an operating point a on the lefthand side of the angled straight line L to an operating point b on the righthand side of the angled straight line L. As a result, the cylinder valves tend to show undersired irregular motion since the engine speed $n_2$ exceeds the lower limit of engine speeds which induce undersired irregular motion of the cylinder valves.

Next, let us assume that the change in engine speed from $n_1$ to $n_2$ occurs when the cylinder valves are operated in accordance with the valve lift diagram as illustrated by the dotted line in FIG. 8A. In FIG. 9, this change in engine speed is expressed by a change from an operating point c to an operating point d. Since both of the operating points c and d are disposed on the lefthand side of the angled straight line L, the cylinder valves are free from undersired irregular motion.

Taking the illustrated relation by FIG. 9 into account, different values in valve duration appropriate to different values or different groups of values in engine speed are determined and stored in the form of a table in the memory section of the controller 10. For example, for a single value or a group of values in engine speed, there is contained a single value in valve duration whose inherent lower limit of engine speeds is not exceeded by the single engine speed value nor any of engine speed values constituting the group. In this manner, different valve durations are specified over a wide range of or all of engine speeds. The values in valve duration which may be taken are limited by the valve duration provided by the valve lift diagram as illustrated by the one-dot chain line and that provided by the valve lift diagram as illustrated by the fully drawn line in FIG. 8A, respectively.

The flow chart in FIG. 10 illustrates a control routine of the preferred implementation of the present invention. At input box 150, the controller 10 inputs information of actual engine speed N1 from the output of the engine speed sensor 36, information of the magnitude of engine load EL from the output of the engine load sensor 38, information of temperature of engine coolant Tc from the output of the engine coolant temperature sensor 40, and information of present gear position GP from the output of the gear position detector 32.

In box 152, the controller 10 determines whether or not the clutch switch 30 is turned on. In the case the clutch switch 152 is turned off in response to engagement state of the clutch 18, the controller 10 updates in box 154 the old gear position GPold by setting GPold equal to the present gear position GP. Then, in box 156, the controller 10 controls valve duration by varying the duty ratio of the solenoid operated valve 132 to adjust the valve lift diagram in response to the actual engine speed N1, engine load NL and engine coolant temperature Tc. For example, different values in valve duration are stored in terms of duty ratio versus different combinations of actual engine speed N1, engine load NL and engine coolant temperature Tc.

Subsequently, if the controller 10 determines in box 152 that the clutch switch 30 is turned on in response to disengagement state of the clutch 18, the controller 10 determines in box 158 whether or not there has occurred any change in gear position by comparing the old gear position GPold with the present gear position GP. If this is not the case, the controller 10 goes to box 154 and then to box 156.

Immediately after the vehicle operator has placed the shift lever 28 to a new gear position with one's foot on the clutch pedal 20 to keep the clutch 18 disengaged, the controller 10 goes from box 152 to box 158 and then to box 159. In box 159, the controller 10 updates the old gear position GPold by setting GPold equal to the present gear position GP. In the next box 160, the controller 10 inputs information of vehicle speed VSP from the output of the vehicle speed sensor 34. At the next box 162, the controller 10 derives an engine speed N2 after completion of the gear shift from information of revolution speed of the transmission output shaft indicated by the vehicle speed VSP and information of a gear ratio inherent with the new gear position. Then, the controller 10 determines in box 164 whether or not the desired engine speed N2 is greater than the actual engine speed N1. If this is the case, the controller 10 determines an appropriate valve duration θ2 by carrying out a table look-up operation of the before discussed table based on the derived engine speed N2. In box 168, the controller 10 determines whether or not the determined valve duration θ2 is greater than the present valve duration θ1. If this is the case, the controller 10 adjusts the new duty ratio supplied to the solenoid operated valve 132 to a new value in correspondance with the new valve duration θ2, adjusting the eccentricity of the annular disc 52 with respect to the driving shaft 46 to a new value which provides a valve lift diagram that produces the valve duration θ2. This gear shift dependent correction or control of valve duration is not effected if the derived engine speed N2 does not exceed the actual engine speed N1 since the controller 10 goes from box 164 to box 156 or if the valve duration 82 does not exceed the present valve duration 81 since the controller 10 goes from box 168 to box 156.

The controller 10 can input information of the present valve duration 81 from the output thereof. Alternatively, the controller 10 can input information of the present valve duration θ1 from output of a sensor which measures hydraulic pressure within the common passage 88 or a sensor which measures an angular displacement of the disc housing 68.

At box 160, the controller 10 inputs information of vehicle speed out of the vehicle speed sensor 34. Alternatively, the controller 10 can input information of vehicle speed out of input information of gear position GP and input information of actual engine speed N1.

Referring to FIG. 9, immediately after the vehicle operator has placed the shift lever 28 to a new gear position with one's foot on the clutch pedal 20 to keep the clutch 18 disengaged when the engine operates on the operation point a, the controller 10 sets the derived engine speed N2 equal to n2. Then, the controller 10 adjusts the valve duration so that the operation point of the engine shifts to the point c prior to completion of the gear shift. Upon completion of the gear shift, the engine shifts to the operation point d.

From the preceding description it is seen that the engine can operate without any undesired irregular motion of the cylinder valves owing to the gear shift correction of valve duration.

It will be appreciated as an advantage that the gear shift dependent valve duration correction makes it possible to extend the use of narrowed valve durations to operation of the engine at low engine speeds. As a result, it becomes easier to operate the intake and/or exhaust cylinder valves for narrowed valve durations at low engine speeds, thus making it possible to advance sufficiently the closing timing of the intake valves for increased charging efficiency and for reduced valve overlap between the intake and exhaust valves at low engine speeds.

The present invention can be applied to a vehicle drivetrain including an automatic transmission. The automatic transmission may take the form of a transmission which can shift automatically to an appropriate one of a plurality of different ratios in a step manner or a so-called continuously variable transmission (CVT) which can carry out ratio control continuously in a stepless manner.

Referring to FIGS. 11 and 12, the second embodiment according to the present invention is described. Comparing FIG. 11 with FIG. 1 reveals that the second embodiment differs from the first embodiment in that an engine 12 is followed by a torque converter 180 and an automatic transmission 182 instead of the clutch 18 and the manual transmission 14. The automatic transmission 182 is of the RE4R01A type described in Service Manual entitled "NISSAN FULL RANGE ELECTRONICALLY CONTROLLED AUTOMATIC TRANSMISSION OF THE RE4R01A TYPE" published in March 1987 by Nissan Motor Co., Ltd. Particular attention should be paid to pages I-6 to I-90 of this Service Manaual. Briefly, the automatic transmission includes a planetary gear train, a plurality of hydraulically operated torque transmitting clutches and brakes, and a hydraulic control system 184 for controlling the torque transmitting clutches and brakes. The hydraulic control system employs a plurality of solenoid operated valves which are responsible to gear shift control, line pressure control and lock-up control of the torque converter 180. A range select lever 186 has and is moveable to six range positions, namely, a parking (P) position, a reverse (R) position, a neutral (N) position, a drive (D) position, a "2" position, and a low (L) position. At the D position, the automatic transmission is automatically shiftable to an appropriate one of different four forward speeds or gear positions establishing different gear ratios, respectively, to meet a gear shift command generated based on stored data on gear position arranged versus various combinations of variables relating to vehicle operator's power demand and vehicle speed. The "L" position or "2" position is selected by the vehicle operator when engine braking is desired. Upon selection of the L position, the automatic transmission 182 is urged to shift to the first speed and then held at the first speed. When the "2" position is selected, the automatic transmission 182 is allowed to shift between the first and second speeds only. One modification is to hold the automatic transmission 182 at the second speed upon selection of the "2" position. A range position detector 188 is provided to detect which one of the positions the range select lever 186 is placed at. The range position detector 188 generates an output signal indicative of the detected position which the range select lever 186 is placed at. The output signal indicative of the range position selected by the range select lever 186 is fed to a controller or a control unit 190.

The controller 190 is substantially the same as the controller 10, but the former is different from the latter in that the controller 190 is combined with a control unit for controlling the automatic transmission 182.

Similarly to FIG. 1, outputs of vehicle speed sensor 34, engine speed sensor 36, engine load sensor 38 and engine coolant temperature sensor 40 are fed to the controller 190.

A gas pedal sensor 192 is provided which measures magnitude of power demand of the vehicle operator by detecting depressed position of a gas pedal which opens in degrees the engine throttle valve. The output of the gas pedal sensor 192 indicative of the vehicle operator's power demand is fed to the controller 190.

In FIG. 11, an arrow 194 represents output of the controller 190 instructing the hydraulic control system 184 in the known manner as described in the Service Manual mentioned above.

The flow chart in FIG. 12 illustrates another control routine of the preferred implementation of the present invention for the drivetrain of FIG. 11. For simplicity of illustration, the same reference numerals are used to designate the same boxes throughout the flow charts in FIG. 10 and FIG. 12.

At input box 200 in FIG. 12, the controller 190 inputs information of actual engine speed N1 from the output of the engine speed sensor 36, information of the magnitude of engine load EL from the output of the engine load sensor 38, information of temperature of engine coolant Tc from the output of the engine coolant temperature sensor 40, and information of present target gear position $GP_T$ which is determined by that section of the controller 190 which is responsible for the gear shift control in the automatic transmission.

In box 202, the controller 190 determines whether or not there has occurred any change in target gear position after comparing the present target gear position $Gp_T$ with old target gear position $GP_{Told}$. If this is not the case, the controller 190 goes to box 204. In box 204, the controller 190 updates the old target gear position $GP_{Told}$ by setting $Gp_{Told}$ equal to the content of the present target gear position $GP_T$. Then, the controller 190 goes to box 156.

Immediately after a change in target gear position $GP_T$, the controller 190 goes from box 202 to box 206. In box 206, the controller 190 inputs information of range Position from the output of the range position detector 188. In the next box 208, the controller 190 determines whether or not the range select lever 186 is placed at such a position as to select the "L" or "2" range. If this is not the case, the controller 190 goes to box 204 and then to box 156. If this is the case, the controller 190 goes to box 210. In box 210, the controller 190 updates the old target gear position $Gp_{Told}$ by setting $Gp_{Told}$ equal to the present gear position $GP_T$. The controller 190 thereafter goes to box 160. In the subsequent boxes 162, 164, 166, 168 and 170, the controller 190 Performs the same jobs as the controller 10 does.

What is claimed is:

1. A cylinder valve control system, for a vehicle drivetrain including an engine and a transmission, comprising a mechanism to vary valve lift diagram along which the cylinder valve is lifted against a valve spring thereof in response to a control signal, and a controller for developing the control signal in response to varying operating condition of the engine, wherein:

the controller derives, at initiation of a shift in the transmission, a value in engine speed to be established after completion of the shift;

the controller has stored therein various predetermined values in engine speed assigned to various valve lift diagrams; and the controller effects correction of the control signal before the completion of the shift such that the mechanism adjusts the valve lift diagram to one of the various valve lift diagrams whose predetermined value in engine speed fails to be exceeded by the derived value in engine speed.

2. A cylinder valve control system as claimed in claim 1, wherein the various valve diagrams provide various valve durations with the maximum valve lift unchanged.

3. A cylinder valve control system as claimed in claim 1, wherein the drivetrain includes a clutch to engage and disengage the engine to and from the transmission, and the transmission has a shift lever which can move to one of a plurality of gear positions.

4. A cylinder valve control system as claimed in claim 3, including:

means for producing a clutch disengagement indicative signal in response to disengagement state of the clutch;

means for producing a gear position indicative signal indicative of which one of the plurality of gear positions the shift lever is placed at; and means for producing a vehicle speed indicative signal indicative of a revolution speed of a transmission output shaft, and wherein the controller inputs information of gear position selected after initiation of disengagement of the clutch from the gear position indicative signal upon production of the clutch disengagement indicative signal, the controller inputs information of vehicle speed at initiation of disengagement of the clutch from the vehicle speed indicative signal at initiation of production of the clutch disengagement indicative signal, and the controller calculates the derived value in engine speed based on the input information of gear position selected after initiation of disengagement of the clutch and the input information of vehicle speed at initiation of disengagement of the clutch.

5. A cylinder valve control system as claimed in claim 4, including:

means for producing an engine speed indicative signal indicative of an actual value in engine speed, and wherein the controller inputs information of actual value in engine speed at initiation of disengagement of the clutch from the engine speed indicative signal at initiation of production of the clutch disengagement indicative signal, the controller compares the input information of actual value in engine speed at initiation of disengagement of the clutch with the derived value in engine speed, and the controller effects the correction of the control signal when the actual value in engine speed is exceeded by the derived value in engine speed.

6. A cylinder valve control system as claimed in claim 3, including:

means for producing a clutch disengagement indicative signal in response to disengagement state of the clutch;

means for producing a gear position indicative signal indicative of which one of the plurality of gear positions the shift lever is placed at; and means for producing an engine speed indicative signal indicative of an actual value in engine speed, and wherein the controller inputs information of gear position selected after initiation of disengagement of the clutch from the gear position indicative signal upon production of the clutch disengagement indicative signal, the controller inputs information of gear position at initiation of disengagement of the clutch from the gear position indicative signal at initiation of production of the clutch disengagement indicative signal;

the controller inputs information of actual engine speed at initiation of disengagement of the clutch from the engine speed indicative signal at initiation of production of the clutch disengagement indicative signal;

the controller derives information of vehicle speed at initiation of disengagement of the clutch out of the input information of gear position at initiation of disengagement of the clutch and the input information of actual value in engine speed at initiation of disengagement of the clutch, and the controller calculates the derived value in engine speed based on the input information of gear position selected after initiation of disengagement of the clutch and the derived information of vehicle speed at initiation of disengagement of the clutch.

7. A cylinder valve control system as claimed in claim 1, wherein the transmission is of an automatic transmission, the automatic transmission being automatically shiftable to one of a plurality of gear positions.

8. A cylinder valve control system as claimed in claim 7, including:

means for producing a vehicle speed indicative signal indicative of a revolution speed of a transmission output shaft, and wherein the controller inputs information of a new target gear position upon initiation of the shift in the transmission, the controller inputs information of vehicle speed at initiation of the shift in the transmission from the vehicle speed indicative signal at initiation of the shift in the transmission, and the controller calculates the derived value in engine speed based on the input information of new target gear position and vehicle speed at initiation of the shift in the transmission.

9. A cylinder valve control system as claimed in claim 8, including:

means for producing an engine speed indicative signal indicative of an actual value in engine speed, and wherein the controller inputs information of actual value in engine speed at initiation of the shift in the transmission, the controller compares the input information of actual value in engine speed at initiation of the shift in the transmission with the derived value in engine speed, and the controller effects the correction of the control signal when the actual value in engine speed is exceeded by the derived value in engine speed.

10. A cylinder valve control system as claimed in claim 8, wherein the automatic transmission has a first range position in which the automatic transmission is shiftable over all of the plurality of gear positions, and a second range position in which the automatic transmission is urged to shift to at least one of the lowest gear position and the adjacent gear position.

11. A cylinder valve control system as claimed in claim 10, including:

means for producing an engine speed indicative signal indicative of an actual value in engine speed, and wherein the controller inputs information of actual value in engine speed at initiation of the shift in the transmission, the controller compares the input information of actual value in engine speed at initiation of the shift in the transmission with the derived value in engine speed, and wherein the controller effects the correction of the control signal upon the actual value in engine speed being exceeded by the derived value in engine speed when the automatic transmission is set to the second range.

* * * * *